March 5, 1940.   G. C. MORGAN   2,192,690
LINTER GIN
Filed March 3, 1938   4 Sheets-Sheet 4
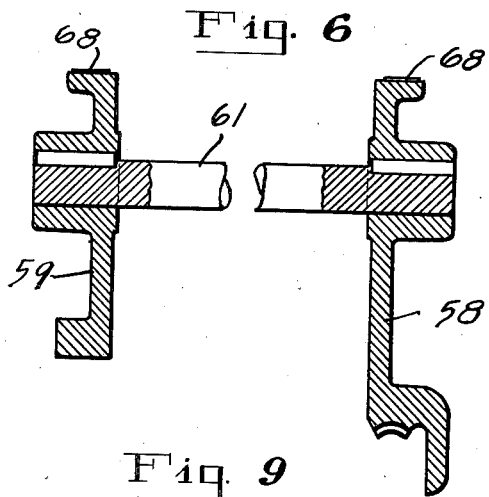
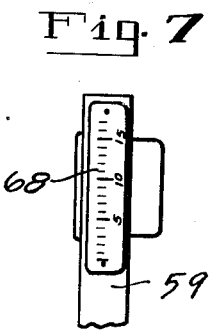
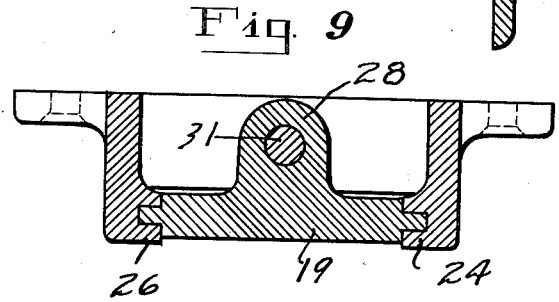
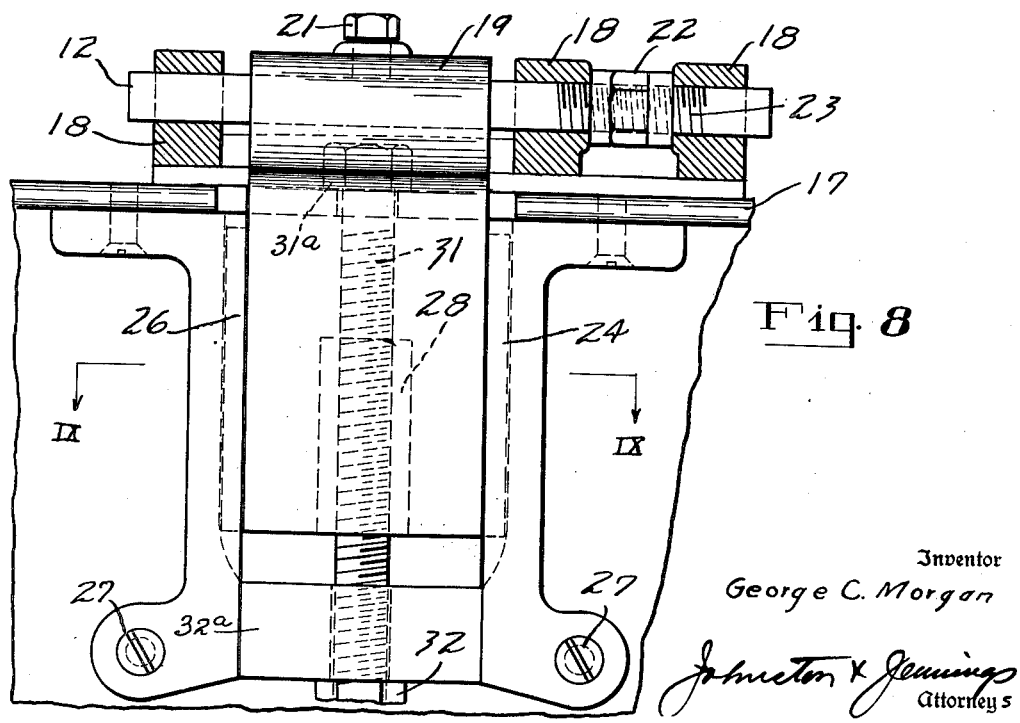
Inventor
George C. Morgan
Johnston & Jennings
Attorneys Patented Mar. 5, 1940

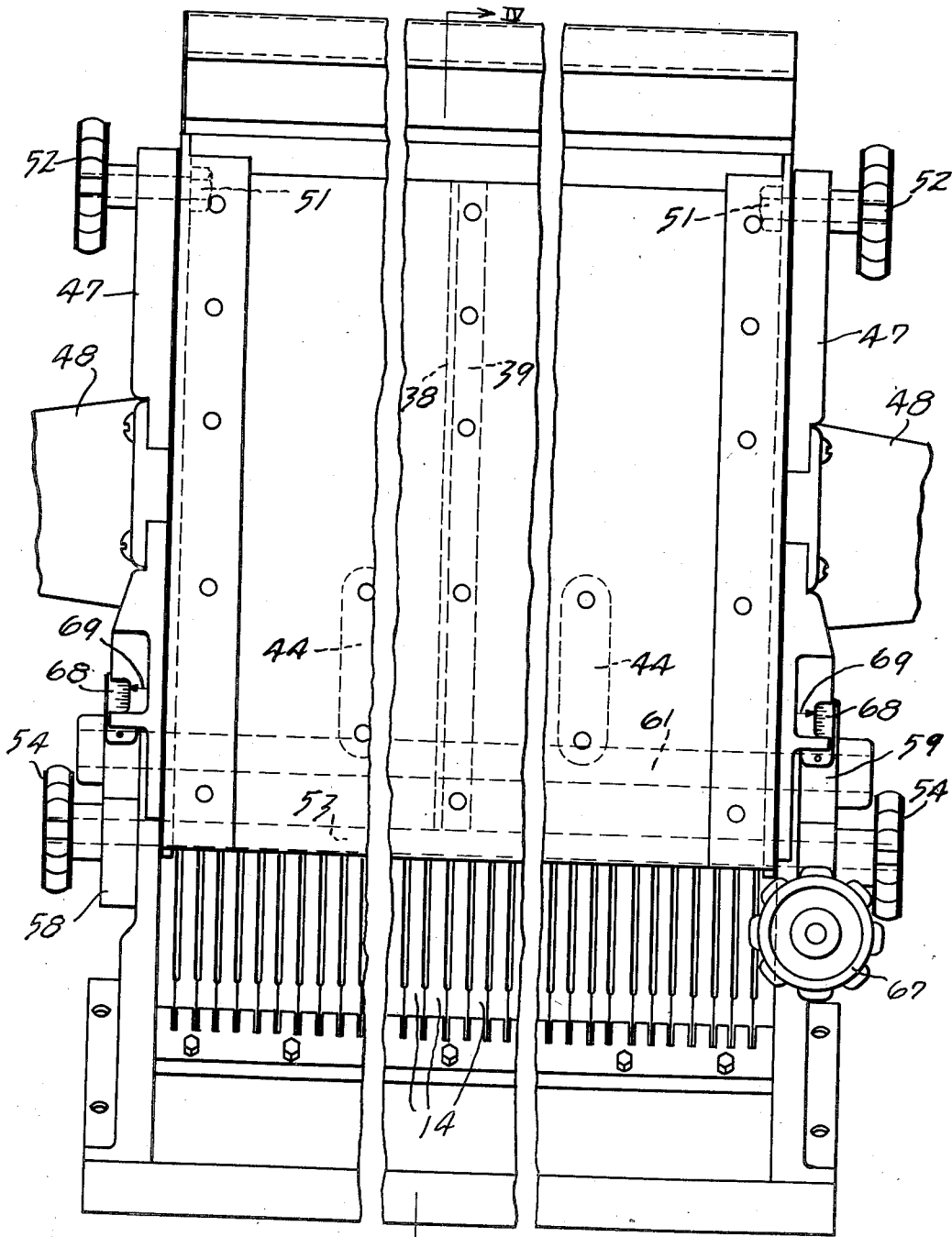

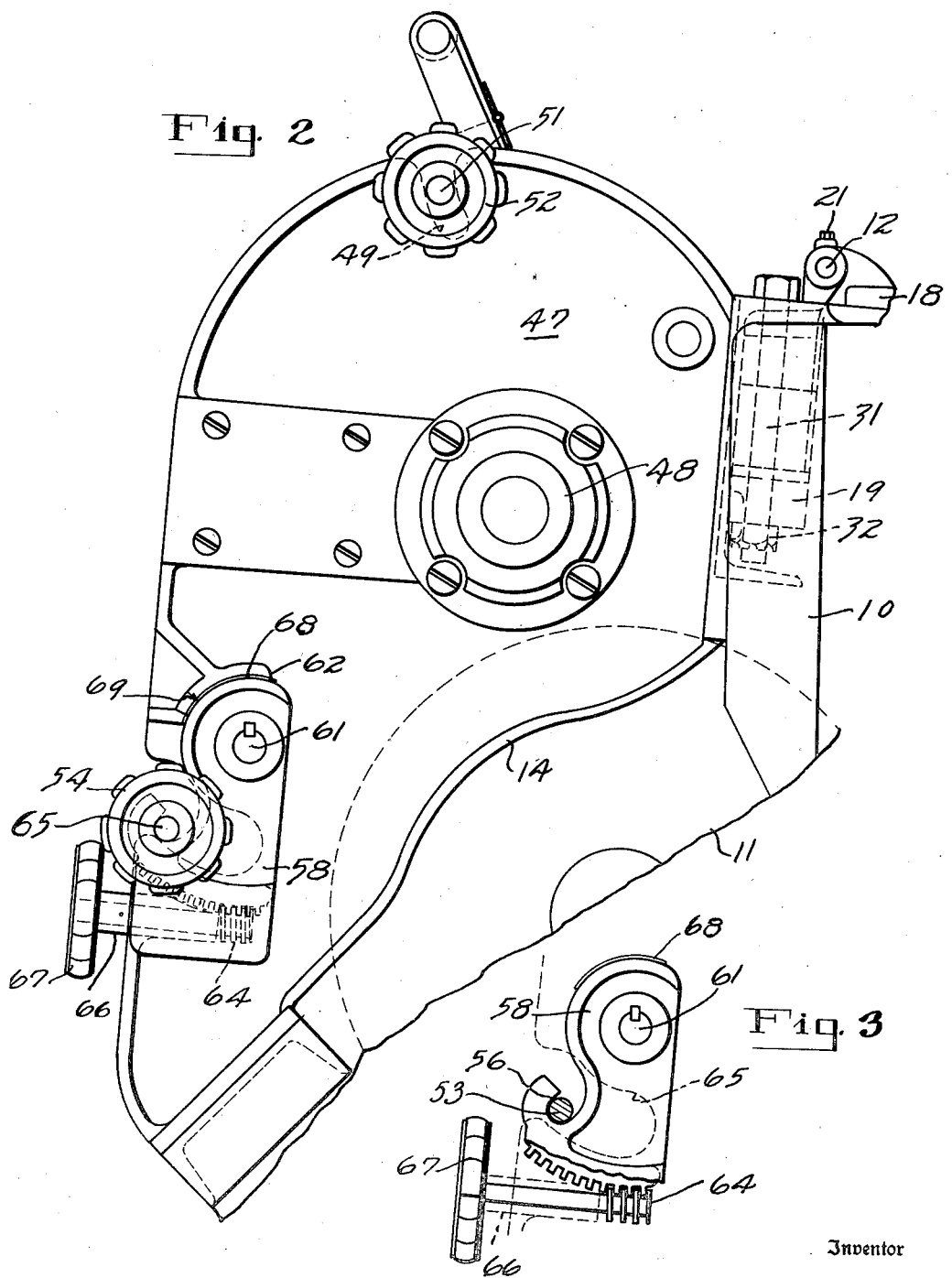

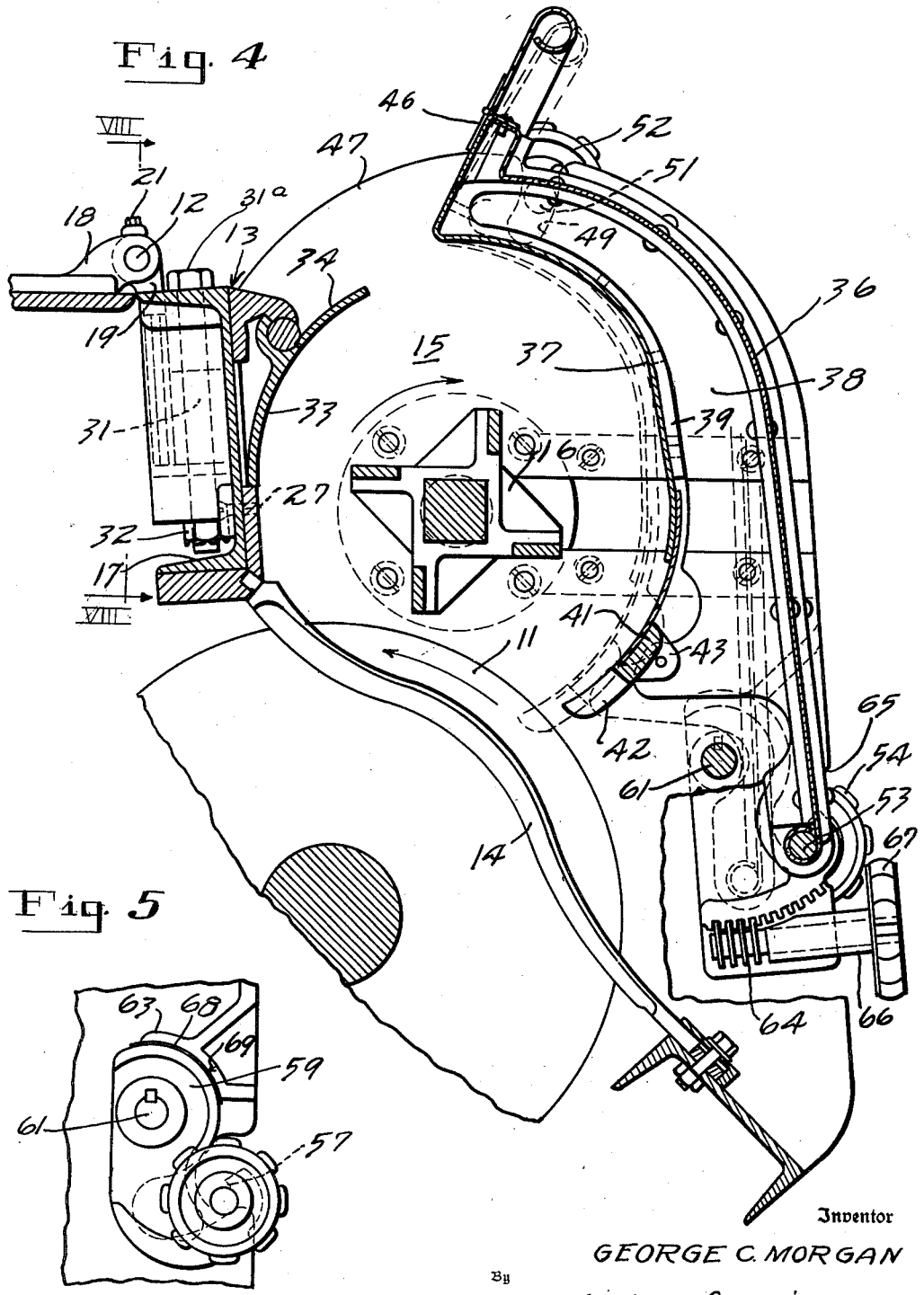

2,192,690

UNITED STATES PATENT OFFICE 2,192,690

LINTER GIN

George C. Morgan, Birmingham, Ala., assignor to Continental Gin Company, a corporation of Delaware Application March 3, 1938, Serial No. 193,626

9 Claims. (Cl. 19—55)

My invention relates to a new and improved means for both adjusting and indicating the adjusted position of the demountable seed boards for gins, and more particularly, but not exclusively, for linter gins.

In the operation of linter gins, occasion arises for the frequent adjustment of the seed board with relation to the grate fall and to the saws and for the removal of the seed board for various purposes. For example, in operation, it is sometimes necessary to remove the saw cylinder as often as three times in twenty-four hours in order to sharpen the saws. This necessitates the removal of the seed board and the opening of the gin breast. When the saws have been sharpened and are replaced, it is highly desirable that the breast and seed board resume their same relative positions with respect to the saws when the parts are again assembled. The position of the breast and seed board should also be altered at times, in order to compensate for wear on the gin saws and the saw cylinder bearings.

Heretofore, in apparatus with which I am familiar, the adjustment of the seed board has been accomplished by movable adjusting elements carried by the seed board which cooperate with relatively fixed elements on the roll box heads. When the seed boards on such apparatus were removed, the adjusting elements, in handling, were sometimes displaced, so that when the seed board was replaced it could not resume its original position. In accordance with my present invention, I provide adjusting hook like hanger elements on the ends of the roll box which cooperate with relatively fixed elements on the seed board. The adjusting elements are so disposed as to operate in unison, whereby there is uniform adjustment at both ends of the seed board. There is also provided an indicator means on the roll box heads, by which the setting of the seed board can be at all times visually ascertained and the setting changed to any required working clearance between the seed board and the saws. This feature also permits the operator to adjust a battery of gins to uniform operating conditions.

The seed board, according to my invention, is provided with bearing elements which are adapted to rest in, and be removable from, suitable slots provided in the roll box heads. The lower slots are formed in angularly movable members mounted in the roll box heads, which are adjustable by means of a rack and worm mechanism, so that the comb may be set to any desired position in the roll box, and the volume of the latter varied to suit operating conditions. The seed board, being readily removable from the slots, may be dismounted and replaced in its original adjusted position. Suitable jamb nuts are provided on the seed board bearing elements for holding the seed board in adjusted position in the slots.

It is a distinctive feature of my invention that the lower slots in the roll box heads are enlarged so that the supporting bearing members for the seed board can, in all positions of the adjusting hanger hooks, allow for the ready lifting and detaching of the lower bearings for the seed board and the latter can be lifted out and restored to operating position without disturbing the adjustment of the hanger hooks.

My invention further contemplates an improvement in the mounting of the gin breast designed to receive my improved type of seed board in that the same may be vertically adjustable with respect to the saw cylinder and thus adapted for use with various types of existing gins, and to this end I provide the gin breast with vertically adjustable pivot members which are pivoted to complemental pivot bearings on the gin frame. By this adjustment, the grate in the gin breast may be set to the proper working level with relation to the saws. Heretofore the attempt has been made to adjust the bearings on the gin frame, but I consider it a distinct advantage to incorporate this adjustment in the gin breast itself so that the gin breast assembly can be supplied as a complete unit ready for attachment to existing gins without change in the latter.

My invention further comprises the novel details of construction and arrangement of parts which are hereinafter more particularly described, reference being had to the accompanying drawings, in which I have illustrated only the preferred embodiment, and in which—

Fig. 1 is a front elevation broken away at several points showing the front of a linter gin equipped with my improved seed board mounting and adjusting appliances;

Fig. 2 is an end elevation of the gin breast with only parts of the gin frame showing sufficient to corelate the same to the gin breast;

Fig. 3 is a detail view of the operating hanger hook shown in Fig. 2, with the lower part of the hook bearing the shroud for its gearing broken away to make clearer its operating relation to the seed board bearing that is seated therein, with dotted lines showing the relation of the hook to the lower slots in the roll box heads;

Fig. 4 is a vertical cross sectional view through the breast taken on the line IV—IV of Fig. 1;

Fig. 5 is a detail view of the adjustable pivot bearing on the gin breast at the end opposite that shown in Fig. 3;

Fig. 6 is a vertical sectional view of the adjustable mounting members shown in Figs. 3 and 5;

Fig. 7 is a detail plan view of the indicating plate employed with my improved apparatus;

Fig. 8 is a detail elevational view of the adjustable gin breast mounting taken on the line VIII—VIII of Fig. 4; and Fig. 9 is a sectional view taken along the line IX—IX of Fig. 8.

Referring to the drawings for a better understanding of my invention, I show a gin comprising a gin frame 10, only a fragment of which is shown, in which is mounted a rotatable saw cylinder 11. Pivotally mounted at 12 on the gin frame 10 is a breast 13. The breast 13, as is well understood, can be swung about its pivot 12 in order to clear the saw cylinder when necessary, and to raise it completely out of the way so that the saw cylinder may be removed and replaced. Mounted in the breast 13 are a plurality of ribs 14 between which the saws on the saw cylinder 11 run to strip the lint from the cotton seed. Within the breast 13, in front of the saw cylinder 11, there is defined a roll box 15 for the cotton or cotton seeds undergoing treatment. The material undergoing treatment is maintained in rotary motion by means of a float 16, the float and saws rotating in the direction shown by the arrows.

A particular feature of my invention is the provision of an improved mounting means for the gin breast. Extending across the gin breast at the top is a channel rail 17, which supports one of the adjustable hinge members for the gin breast, which will presently be described, and which is shown in detail in Figs. 8 and 9. Each of the adjustable hinges comprises outer hinge members 18 secured to the gin frame, and inner hinge members 19 secured to the channel rail 17. The pivot pin 12 passes through aligned holes in the members 18 and 19, and the hinge member 19 is secured against longitudinal movement thereon by means of a set screw 21 screwed into the top of the member 19. The pivot pin 12 is held against longitudinal movement by means of nuts 22 secured on to a threaded portion 23 of the pivot pin 12 and located between the spaced outer portions of the members 18. Each of the members 19 is slidably supported in guides 24 and 26 that are cross connected at their lower ends by the web 32a and secured by means of screws 27 to the channel 17. While the channel 17 and guides 24 and 26 are shown as made up of separate elements, it will be obvious that they may be cast in a single piece.

Fast on the back face of each breast supporting hinge member 19 I provide a lug 28 (Fig. 9) which is drilled and tapped to provide a vertical threaded hole therethrough. A screw bolt 31 for each hinge member has a head 31a and is passed loosely down through a hole in the top flange 17 and screwed through its respective lug 28, its lower end being passed freely through a hole in web 32a where it receives a lock nut 32 which engages web 32a so as to support it and, through guides 24 and 26, the channel and breast. By applying a wrench to each bolt head 31a and turning the bolts in the desired direction nuts 32 will be moved upwardly or downwardly by the threaded engagement of the bolts with their respective lugs 28 and the two bolts will thus serve by means of their lock nuts 32, to raise or lower the breast relatively to its fixed hinge pins 12 on the gin frame. By comparison of Figs. 2 and 4, it may be seen that one of these improved breast adjusting assemblies coact with a fixed hinge support 12 disposed at each end of the gin breast. By the adjustment shown, the breast may be raised or lowered with respect to the gin frame and placed at its proper position with respect to the saw cylinder 11, best suited for operating conditions. My improved gin breast may thus be fitted on gins of different manufacture involving a difference in distance between the breast pivots fixedly mounted at the top of the gin frame and the center of the gin saws, without involving any special design, it only being necessary to hang the breast in place and then to adjust it to its proper position vertically by means of the bolts 31.

It will also be appreciated by those skilled in the art that the adjustment just described may be employed to vary the relation of the grate fall to the saw cylinder and thus modify the operation of the gin as a whole. In combination with the seed board adjustment yet to be described there is provided a flexibility of control of operation which, so far as I am aware, is entirely novel.

The roll box 15 is further defined by a rear curved plate 33, to which is secured a movable curved plate 34. The latter plate is operated in a manner well understood automatically to regulate the feed to the gin. The front of the roll box is defined by a seed board comprising an outer plate 36 and an inner curved plate 37. The curved plate 37 is secured to the outer plate 36 by means of gussets or ribs 38 having flanges 39 to which the inner plate 37 is connected.

At the lower end of the inner curved plate 37 is mounted the comb body 41 having comb teeth 42. It is understood that the comb teeth are adapted to cooperate with the saw cylinder 11, and they may be adjusted, by means hereinafter described, to the dotted position shown in Fig. 4, with the teeth extending between the saws. The comb body is further supported by bracket members 43 secured to the gussets 38, and to other bearing brackets 44 shown in dotted lines in Fig. 1, and interposed between the gussets 38. The upper end of the seed board is turned upwardly and outwardly at 46 to form a feed chute for the gin.

The ends of the roll box are formed of suitable members 47, usually referred to as roll box heads, which serve to support the bearings 48 for the float 16, and for the support of the seed board. In each of the roll box heads 47 near the top is an upwardly and outwardly extending slot 49. Mounted on the seed board at the upper end thereof on each side is a stud 51 extending outwardly and resting in the slot adjacent 49. Manually operated jamb nuts 52 are threaded on to the studs 51 and, when the seed board is in place, are tightened down to hold it in its adjusted position. The outer plate 36 on the seed board, at the bottom, is curved around a rod 53 extending across the front of the gin breast. The rod 53 is threaded on its ends to receive hand operated jamb nuts 54 similar to the jamb nuts 52 on the studs 51, and which serve to hold the lower edge of the seed board in adjusted position. The rod 53 is adapted to rest in slots or hooks 56 and 57 formed in hanger members 58 and 59 at the opposite ends of the gin breast, and which are fixedly mounted on a shaft 61 extending across the gin breast and carried in suitable bearings 62 and 63 in the gin breast heads. The hanger members 58 and 59 are angularly adjustable about the axis of the rod 61 as a center, said adjustment being accomplished by means of a worm 64 mounted in a housing 66 carried by the gin breast head and operated by means of a hand wheel 67 extending out in front of the gin breast. The hanger members 58 and 59 being keyed to the shaft 61 move in unison when the worm 64 is rotated and the seed board, with its comb 41, is brought nearer to, or is moved outwardly from the grate fall and the saw cylinder 11. It will also be apparent that, with the jamb nuts 52 and 54 loosened, the seed board may be lifted out of the slots 49 and 65 without disturbing the setting of the hanger members 58 and 59, and can be replaced to assume its original position. The roll box heads are provided with slots 65 to permit the rod 53 to move inwardly of the gin breast to its extreme adjusted position. The slots 65 are also wide enough to permit the removal of the seed board by lifting its top pins 51 out of slots 49 and by lifting its bottom rod 53 out of the hanger members and out of slots 65 regardless of the adjustment of the hanger members and without disturbance of such adjustment.

By reference to Fig. 4, it will be seen also that as the seed board is moved inwardly by operation of the worm 64, it serves to contract the area of the roll box and thus materially modifies the action of the gin. Also, it will be seen that while the principal movement of the seed board while being adjusted is at the bottom, there is a slight vertical movement of the elements 51 in the upper slots 49.

On each of the hanger members 58 and 59 is a graduated scale or plate 68 which coacts with the pointer 69 on the bearing 63 for the hook hanger members and thus provides a visual indication of the setting of the seed board at all times. Where a number of gins are in operation, the operator may, by means of the indicators, adjust them all to a uniform setting.

From the foregoing it will be apparent that I have devised an improved linter gin having great flexibility of adjustment to operating conditions, and which embodies a gin breast adapted for mounting on various types of gins, and a removable seed board with improved adjusting means with reference to the remainder of the breast.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In apparatus of the character described, the combination of a gin frame, a breast including a roll box, a removable seed board, open slots in the upper part of the roll box heads, bearing members on the seed board removably and adjustably mounted in the slots, angularly movable hook members carried by the roll box heads for supporting the lower edge of the seed board and adjusting it bodily to different operating positions, bearing members on the seed board demountably seated in the hook members, and means for adjusting the positions of the hook members and maintaining the same with the seed board in adjusted position.

2. Apparatus as set forth in claim 1, in which the hanger hook members are keyed to a single shaft for movement in unison, and the shaft is juxtaposed to the lower seed board bearing members to rock them through an arc having a short radius thereby to provide both lateral and vertical adjustments for the seed board.

3. In apparatus of the character described, a gin breast including a roll box, roll box heads having upwardly and outwardly inclined guides formed by upwardly opening slots in the upper part thereof, hook members pivotally mounted on the lower part of the roll box heads and adapted for angular movement inwardly and outwardly of the roll box, a shaft upon which both of the hook members are fixedly mounted, worm gear means for operating one of the hook members and through it the said shaft and the other hook member, and a seed board having bearing members removably mounted in said slots and hook members and bodily adjustable by said hook members.

4. In apparatus of the character described, a gin frame, a breast, a roll box, heads for the roll box having inclined seed board guide slots in the upper part thereof, a seed board having bearing elements and releasable means to secure them in the slots, angularly movable hook elements mounted in the lower part of the roll box heads, said hook elements being adapted to demountably support the lower edge of the seed board, a shaft upon which said hook elements are fixedly mounted for simultaneous angular movement, gear teeth on one of the hook elements, and a worm coacting with the gear teeth to adjust the position of said hook members.

5. In a linter gin, a gin breast embodying a roll box, a seed board, guide slots formed in the upper part of the roll box heads for removably mounting the seed board, angularly movable hanger members mounted on the lower part of the roll box and having supporting slots therein for removably mounting the lower edge of the seed board, worm gear mechanism for adjusting the position of the angularly movable members, and bearing members on the seed board resting in the slots, there being slots formed in the roll box heads to allow for angular movement of the bearing members while supported by said hanger members and to provide for removal of the seed board without disturbing its hanger members.

6. In a linter gin, a breast having a demountable seed board, roll box heads having upper and lower guide slots for seed board mounting elements, upper mounting elements for the seed board adjustable in and removable from the upper guide slots, means to secure said upper elements in any desired position, lower mounting elements for said seed board adjustable in and removable from said lower guide slots, a hanger shaft above and juxtaposed to said lower slots, a hanger fast on each end of the said shaft adapted to demountably support said lower mounting element and swing them through said lower slots on a short radius arcuate path, a worm drive for adjusting and locking said hanger shaft, said lower slots being designed to allow the ready disengagement of said lower bearing elements from the hangers whatever their positions and without disturbance of their set adjustment, and means to clamp said lower mounting elements to their respective hangers.

7. An apparatus as set forth in claim 1, in which the hook members are mounted exteriorly of the roll box heads, and one of said members and the adjacent roll box head carry coacting indicator elements to show the set position of the hangers.

8. An apparatus as set forth in claim 1, in which the hook members are keyed to a single shaft and disposed exteriorly of the roll box heads, each hook member having on its upper curved edge an indicator scale and each head having an indicator pointer coacting with its respective scale to indicate from both ends of the gin the set position of the seed board.

9. In a linter gin, a gin breast, a seed board demountable from the breast, a seed board setting assembly forming a component part of the gin breast and comprising upper guides and movable lower supports, and means to adjust the latter to different operating positions, and fixed mounting elements on the seed board adapted to engage said supports and to be moved thereby to produce any desired adjustment of the seed board upwardly and outwardly on the gin breast, said mounting elements being readily engageable with and releasable from said setting assembly throughout the full adjustment of the latter and without disturbance of the latter's position on the breast.

GEORGE C. MORGAN.